United States Patent [19]
Chmiel

[11] 3,908,442
[45] Sept. 30, 1975

[54] APPARATUS FOR MEASURING RHEOLOGICAL VALUES OF SUBSTANCES CAPABLE OF FLOWING

[76] Inventor: Horst Chmiel, 12, Paul-Rontgen-Strasse, 5100 Aachen, Germany

[22] Filed: Apr. 2, 1974

[21] Appl. No.: 457,306

[30] Foreign Application Priority Data
Apr. 6, 1973   Germany............................ 2317321

[52] U.S. Cl. ................................................... 73/55
[51] Int. Cl.² .......................................... G01N 11/04
[58] Field of Search .................................. 73/55, 56

[56] References Cited
UNITED STATES PATENTS

| | | |
|---|---|---|
| 2,934,944 | 5/1960 | Eolkin.................................... 73/55 |
| 3,468,158 | 9/1969 | Chien.................................... 73/55 |

FOREIGN PATENTS OR APPLICATIONS

| | | | |
|---|---|---|---|
| 252,718 | 2/1970 | U.S.S.R................................. | 73/56 |
| 212,613 | 4/1968 | U.S.S.R................................. | 73/55 |
| 443,398 | 2/1936 | United Kingdom................... | 73/55 |

Primary Examiner—Richard O. Queisser
Assistant Examiner—Joseph W. Roskos
Attorney, Agent, or Firm—Neil F. Markva

[57] ABSTRACT

Apparatus for measuring rheological values, such as the viscosity and visco-elasticity, of substances capable of flowing, by means of two measuring tubes of different length, by determining the relationship between the throughflow per unit of time and the relevant pressure loss in the measuring tubes comprises two measuring tubes of different length but of equal diameter. The measuring tubes are associated with two measuring chambers which are connected to two pump cylinders having the same delivery performance by means of connecting conduits. Each of the pump cylinders accommodates a piston adapted to be driven by one common motor via its piston rod at an equal and constant speed. Furthermore, a differential pressure meter is mounted between the two measuring chambers which are connected up to said measuring tubes, said pressure meter indicating the differential pressure caused by the difference in the length of the measuring tubes and said differential pressure providing a measure of the value to be determined.

3 Claims, 3 Drawing Figures

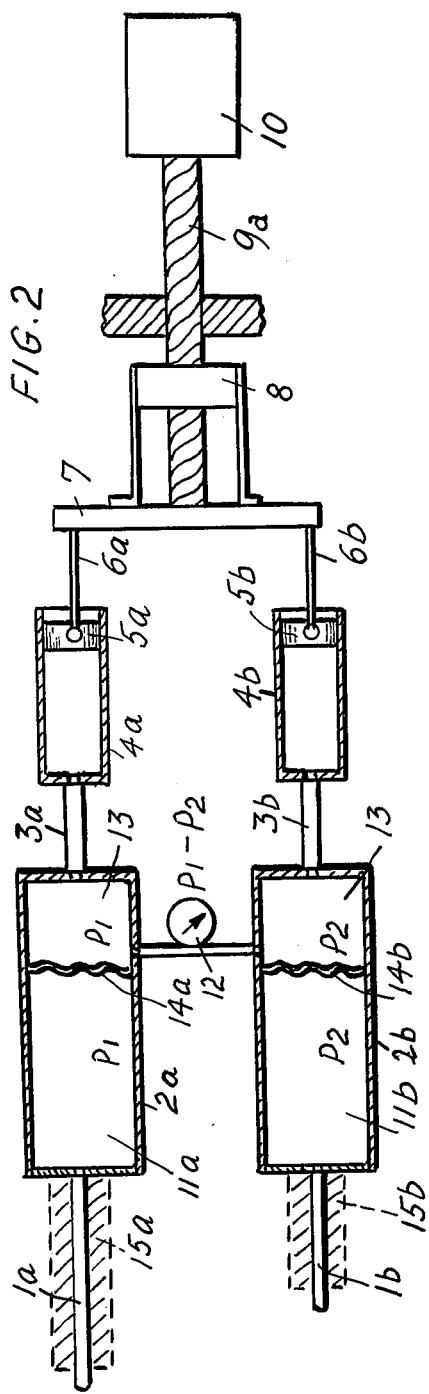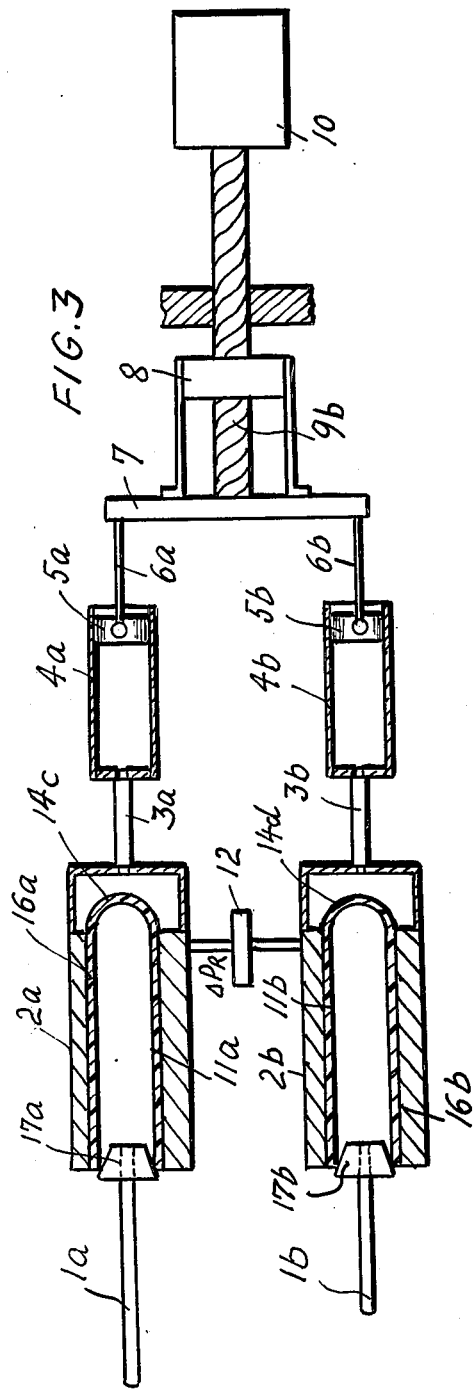

APPARATUS FOR MEASURING RHEOLOGICAL VALUES OF SUBSTANCES CAPABLE OF FLOWING

BACKGROUND OF THE INVENTION

This invention relates to an apparatus for measuring rheological values, such as the viscosity and viscoelasticity, of substances capable of flowing, by determining the relationship between the through-flow per unit of time and the relevant pressure loss in a tubular rheometer.

Hitherto such measurements have been carried out in succession, in rheometer tubes of different lengths. This makes it possible, by determining the pressure difference between the two tubes, for the influences which occur at the beginning and at the end of the tube and which falsify the actual measuring result to be eliminated by subtraction. The pressure difference which occurs between the short measuring tube and the long one, for a given through-flow, corresponds to the friction of the substance in the differential tube length. The difference generally has to be recorded graphically, the result providing a measure of the dynamic viscosity of the substance in question. This known measuring method, however, is very complicated and inaccurate because the two measuring operations have to be carried out in succession in the two tubes of different lengths. The different conditions prevailing when the two curves are drawn are very liable to lead to deviation values which may result in comparatively serious errors when the difference is formed graphically.

A further drawback of the known apparatus resides in the fact that the substance to be measured comes in contact with the pressure meter. The latter may thereby suffer damage if the substances in question are of aggressive nature or agglutinative.

SUMMARY OF THE INVENTION

It is therefore the object of the invention to provide a measuring apparatus for measuring the dynamic viscosity of substances capable of flowing, providing a direct reading of the measuring result without the necessity for an interpretation of individual measurements by means of a graph and the consequent risk of errors and at the same time protecting the apparatus from damage in cases in which the substances to be measured are of an aggressive nature.

To attain this object the invention proposes, in connection with a measuring apparatus of the type described at the beginning, that one feed pump is to be associated with each of two rheometer tubes of different lengths, the delivery performamces of the pumps being equal and constant and their pistons being driven by one common motor at an equal and constant speed of delivery, while a differential pressure meter is mounted between the two rheometer tubes to indicate the differential pressure resulting from the difference in their length. This differential pressure is a measure of the dynamic viscosity of the substance forced through the tubes.

In order to prevent the substance to be measured from coming in contact with the differential pressure meter, the said substance may be separated by means of a diaphragm and in a manner known per se from a special driving liquid, this latter being conveyed by the pump and acting on the pressure meter. As the inherent rigidity of the diaphragm is very limited, the pressure thus measured is practically equal to that prevailing in the substance to be measured and present on the other side of the diaphragm. This system offers the further advantage of indicating the quantitative through-flow of the substance to be measured since owing to the incompressibility of liquids the through-flow in the measuring tube is equal to the quantity of driving liquid conveyed by the driving pump in a given period.

The diaphragm may have the shape of a finger stall and be accommodated in a suitable recess in the measuring cylinder, in which case the open end of the diaphragm containing the substance to be measured communicates with the rheometer tube, while the driving liquid acts on the closed end of said diaphragm.

To ensure even and constant delivery by the two pumps, one synchronous motor is preferably used to drive both of them. In the measuring apparatus proposed by the invention the intake and discharge effects in the rheometer tubes are eliminated without the need for any special measures for this purpose, provided a stationary flow is obtained in the foregoing manner. This result is due to the following relationships:

Both in the short measuring tube and in the long one the overall pressure difference is made up of the sum of the pressure differences in the intake, in the discharge and in the friction. When the difference is formed between the two overall pressure differences, those occurring in the intake and in the discharge are eliminated, leaving the following equation:

$$(\Delta p_{tot})_L - (\Delta p_{tot})_K = (\Delta p_{fr})_L - (\Delta p_{fr})_K$$

This difference, however, is the required pressure difference for the friction to which the substance to be measured undergoes in the tube length difference, i.e., the measurement sought for the dynamic viscosity of the said substance.

BRIEF DESCRIPTION OF THE DRAWINGS

Three embodiments of the invention will now be described by way of example and with reference to the accompanying drawings, in which:

FIG. 2 is a second embodiment in which the substance to be measured is separated from a special driving liquid by a diaphragm, and FIG. 3 illustrates an alternative embodiment of the embodiment shown in FIG. 2.

DESCRIPTION OF THE PREFERRED EMBODIMENTS

Figure 1:
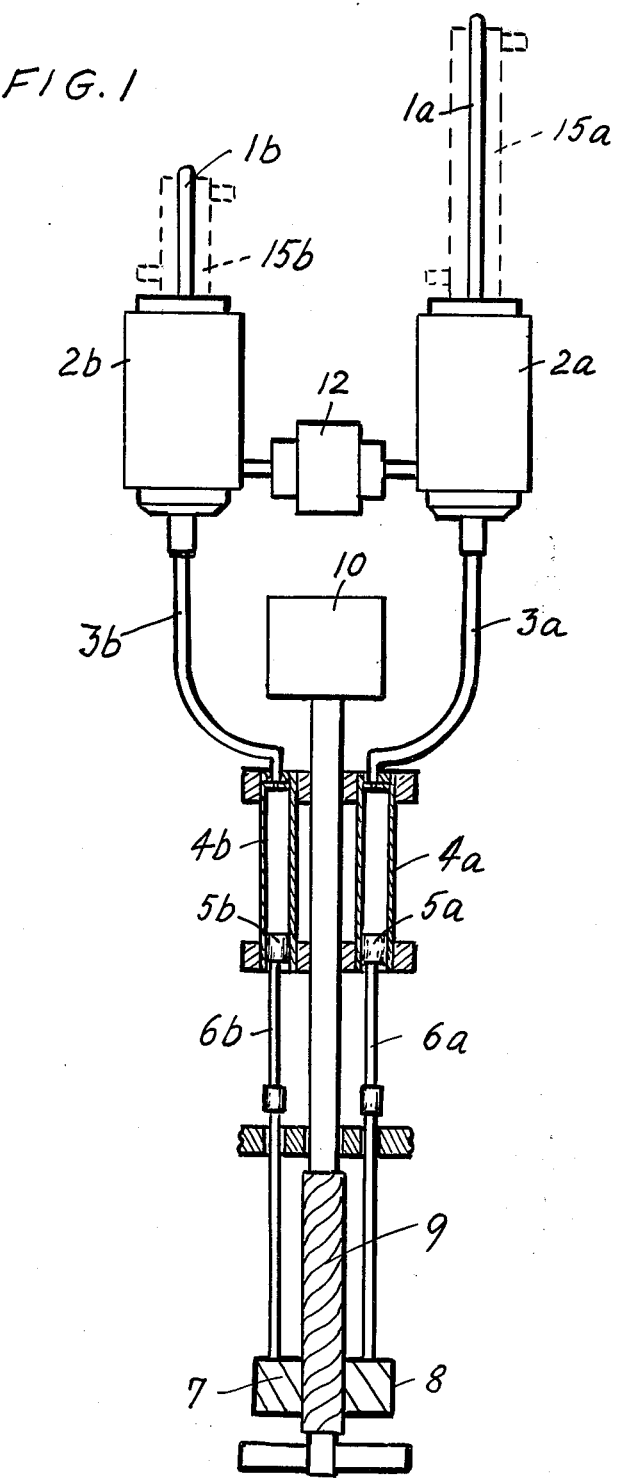
FIG. 1 is a first embodiment of the proposed apparatus in which the differential pressure is determined in the actual substance being measured.

FIGS. 1 to 3 show a measuring apparatus which in all three embodiments consists of two measuring tubes 1a and 1b of different lengths but of equal diameter and of a differential pressure meter 12. The measuring tubes 1a and 1b which may be thermally stabilizable by means of a casing 15a and 15b respectively, are connected up in a pressure-tight manner to measuring chambers 2a and 2b respectively; these chambers being connected to pump cylinders 4a and 4b having the same delivery performance via connecting conduits 3a and 3b respectively. The pistons 5a and 5b of the two pump cylinders 4a and 4b are connected to a threaded nut 8 via their piston rods 6a and 6b which act on a traverse 7. The nut 8 surrounds a threaded spindle 9 driven at a constant speed of rotation by a synchronous motor 10. The pump cylinders 4a and 4b, the connecting conduits 3a and 3b, the measuring chambers 2a and 2b and the measuring tubes 1a and 1b are in each case of the same diameter in that part of the measuring apparatus which corresponds to the long measuring tube 1a and in the part corresponding to the short measuring tube 1b. The two rheometers differ solely in the length of the measuring tubes. The same quantity of the substance to be measured is therefore forced through both measuring tubes at an equal and constant speed. The friction of the substance, however, differs between one measuring tube and the other, owing to the difference in the lengths of the tubes, a circumstance which manifests itself in the differential pressure to be measured for the tube length difference. The differential pressure meter 12 is mounted between the measuring chambers 2a and 2b for the purpose of measuring this pressure difference. To this extent all three embodiments of the invention are designed on the same lines.

In the embodiment shown in FIG. 1 the substance to be measured is driven directly by the pistons 5a and 5b of the pumps through the measuring tubes 1a and 1b and thus acts on the differential pressure meter 12 in the process. This may under certain ciircumstances lead to the damage already mentioned.

In the embodiment shown in FIG. 2 this drawback is avoided by the use of a special driving liquid 13 which is conveyed by the pistons 5a and 5b and separated by a diaphragm 14a, 14b from the substance 11a, 11b to be measured. The diaphragm takes the form of a corrugated circular disc and is mounted in a measuring chamber 2a, 2b of which one end is connected with the relevant pump cylinder and the other with the appropriate measuring tube, and which precedes the measuring tube in question and which is thereby subdivided into two compartments P1 and P2 respectively. The compartments P1 and P2 formed in the chamber ends remote from the measuring tubes 1a and 1b contain the driving liquid 13. The connection for the differential pressure meter 12 also branches off from these compartments so that the said meter is subjected to the action of the driving liquid which does not damage it. As the diaphragms 14a and 14b only have slight inherent rigidity, the substance to be measured has practically the same pressure as the driving liquid.

FIG. 3 shows an embodiment having diaphragms 14c and 14d which do not consist of circular discs as in FIG. 2 but each have the shape of a finger stall inserted with the substance to be measured in a recess 16a, 16b of the measuring chamber 2a, 2b. The closed end of the diaphragm which contains a preselected quantity of the substance to be measured is subjected to the action of the driving liquid 13, whereas the open end is clamped in a pressure-proof manner to the measuring chamber by means of a plug 17a, 17b containing a boring and shaped onto the measuring tube. As the pump pistons 5a and 5b of two pump cylinders 4a and 4b convey the driving liquid, the latter, owing to the incompressibility of liquids, forces the substance to be measured through the measuring tubes. The shape selected for the diaphragm 14c, 14d, i.e., that of a finger stall, offers the advantage that after the measurement has been carried out it can be discarded, so that the measuring chamber does not have to be cleaned. The advantages described with reference to the embodiment shown in FIG. 2 are naturally maintained here as well.

The quantitatively equal flow in the two measuring tubes of unequal length, as required by the principle of this measuring system, can be most satisfactorily obtained by the use of one single motor 10 as a means of driving both pumps via one common intermediate gearing consisting of the components 6a - 9a and 6b - 9b, the said driving motor consisting of a synchronous motor, electronically controlled or otherwise. The measuring apparatus described is suitable for the measurement of the viscosity and viscoelasticity of any types of substance capable of flowing. It is designed with a particular view to its industrial use for polymer solutions, suspensions and pastes.

The invention may be embodied in other specific forms without departing from the spirit or essential characteristics thereof. The embodiments are therefore to be considered in all respects as illustrative and not restrictive.

What is claimed is:

1. Apparatus for measuring rheological values such as the viscosity and visco-elasticity of substances capable of flowing, said apparatus comprising:
   a. two measuring tubes having equal diameters and different lengths with respect to each other,
   b. each of two separate measuring chambers g tube
   c. two pump cylinders each having a piston and rod and the same delivery performance,
   d. conduits for connecting each of said pump cylinders to a respective one of said measuring chambers,
   e. single means for driving the piston and rod of each pump cylinder simultaneously at an equal and constant speed,
   f. a differential pressure meter connected to both of the chambers for indicating the differential pressure caused by the difference in the length of the measuring tubes,
   g. said chambers each including a movable diaphragm,
   and
   h. means for conveying a special driving liquid on one side of the diaphragms, through said pump cylinders and differential pressure meter.

2. Apparatus as defined in claim 1 wherein
said cylinders are connected at one end of said respective chambers and
said measuring tubes are connected to the other end of said respective chambers,
said differential pressure meter being connected to the ends of the measuring chambers on which the driving liquid acts.

3. Apparatus as defined in claim 1 wherein
each said diaphragm has the shape of a finger stall with an open end and a closed end and
each said chamber has an appropriate recess for receiving a respective diaphragm which is disposed with its closed end subjected to said special driving liquid,
each of said measuring tubes being unmovably connected to the open end of a respective diaphragm, said diaphragm being effective to contain a preselected quantity of substance to be measured.

* * * * *

UNITED STATES PATENT OFFICE
CERTIFICATE OF CORRECTION

PATENT NO. : 3,908,442
DATED : September 30, 1975
INVENTOR(S) : Horst Chmiel

It is certified that error appears in the above-identified patent and that said Letters Patent are hereby corrected as shown below:

Claim 1, column 4, line 26, delete "g tube" at the end of the line.

line 27, insert --connected to a respective one of said measuring tubes,--.

Signed and Sealed this twentieth Day of April 1976

[SEAL]

Attest:

RUTH C. MASON
Attesting Officer

C. MARSHALL DANN
Commissioner of Patents and Trademarks